(12) United States Patent
Mukasa et al.

(10) Patent No.: US 6,178,279 B1
(45) Date of Patent: Jan. 23, 2001

(54) DISPERSION COMPENSATING OPTICAL FIBER, AND WAVELENGTH DIVISION MULTIPLEX LIGHT TRANSMISSION LINE USING THE SAME

(75) Inventors: Kazunori Mukasa, Ichihara; Yoshihisa Suzuki, Funabashi, both of (JP)

(73) Assignee: The Furukawa Electric Co. Ltd., Tokyo (JP)

( * ) Notice: Under 35 U.S.C. 154(b), the term of this patent shall be extended for 0 days.

(21) Appl. No.: 09/045,516

(22) Filed: Mar. 20, 1998

(30) Foreign Application Priority Data

Mar. 25, 1997 (JP) .................................... 9-090168

(51) Int. Cl.[7] .................................................. G02B 6/10
(52) U.S. Cl. ........................................... 385/123; 385/127
(58) Field of Search ........................... 385/24, 123, 127

(56) References Cited

U.S. PATENT DOCUMENTS

| | | | |
|---|---|---|---|
| 5,568,583 | 10/1996 | Akasaka et al. | 385/123 |
| 5,673,354 | 9/1997 | Akasaka et al. | 385/127 |
| 5,995,695 | * 11/1999 | Aikawa et al. | 385/123 |
| 6,031,955 | * 2/2000 | Mukasa | 385/123 |

FOREIGN PATENT DOCUMENTS

| | | |
|---|---|---|
| 62-215207 | 9/1987 | (JP) . |
| 63-208005 | 8/1988 | (JP) . |
| 8-313750 | 11/1996 | (JP) . |

OTHER PUBLICATIONS

"Third Order dispersion compensating fibres for non-zero dispersion shifted fibre links" M. Onishi et al. *Electronics Letters*, vol. 32, No. 25, Dec. 5, 1996 pp. 2344–2345.

"Broadband dispersion-compensating fiber for high-bit rate transmission network use" V.A. Semenov et al. *Applied Optics*, vol. 34, No. 24 Aug. 20, 1995, pp. 5331–5337.

* cited by examiner

*Primary Examiner*—Hung N. Ngo
(74) *Attorney, Agent, or Firm*—Lacasse & Associates

(57) ABSTRACT

The invention relates to a dispersion compensating optical fiber which is connected to a single-mode optical fiber having zero dispersion in the wavelength of 1.31 $\mu$m and has both a dispersion compensating function and a function serving as an optical transmission line, wherein the distribution of refractive indexes of dispersion compensating optical fiber is of W-type profile, the dispersion value in the wavelength of 1.55 $\mu$m is in a range from −20 ms/nm/km or more to −10 ps/nm/km or less, the ratio of dispersion slope to the dispersion value in the wavelength of 1.55 $\mu$m is set to almost the same as the absolute value of the ratio of dispersion slope with the dispersion value in the same wavelength of 1.55 $\mu$m of the single-mode optical fiber while the positive and negative codes thereof are inversed, the specific refractive index difference $\Delta+$ of center core 1 to clad 3 is in the range from 1.0% or more to 1.8% or less, the ratio R $\Delta$ of the specific refractive index difference $\Delta-$ of side core 2 to clad 3 with respect to the specific refractive index difference $\Delta+$ is made −0.025 or less, the ratio Ra (Ra=a/b) of center core 1 to the diameter b of the side core is in a range from 0.3 to 0.4, and the mode field diameter is 6 $\mu$m or more.

12 Claims, 3 Drawing Sheets matched type segment core type double core type

DISPERSION COMPENSATING OPTICAL FIBER, AND WAVELENGTH DIVISION MULTIPLEX LIGHT TRANSMISSION LINE USING THE SAME

FIELD OF THE INVENTION

The present invention relates to a dispersion compensating optical fiber which is connected to a single-mode optical fiber having zero dispersion in the wavelength band of 1.3 μm, so as to perform a function of compensating dispersion in an optical signal in the wavelength band of 1.55 μm which is transmitted through the single-mode optical fiber, while serving as a transmission optical fiber. The present invention also relates to a wavelength division multiplex light transmission line using such a dispersion compensating optical fiber.

BACKGROUND OF THE INVENTION

As a transmission network for optical communication, single-mode optical fibers having zero dispersion in the wavelength band of 1.3 μm are installed all over the world. In recent years, as the information-oriented society has developed, the quantity of communication information has been dramatically increasing. The explosion of the quantity of information has made wavelength division multiplex transmission (WDM transmission) widely accepted in the field of communication. Now, the world is in the age of wavelength division multiplex transmission. Wavelength division multiplex transmission is a method in which a wavelength for optical communication is divided into a plurality of wavelengths to transmit a plurality of optical signals instead of using only one wavelength for optical communication, and therefore, is a light transmission method which is suitable to large-capacity high-speed communication.

However, in general, the installed single-mode transmission optical fibers which have zero dispersion at 1.31 μm have a large transmission loss. Hence, when wavelength division multiplex optical communication is to be realized using the wavelength band of 1.3 μm, since the wavelength range of the installed single-mode transmission optical fibers does not match a wavelength band of 1.55 μm which is a gain bandwidth of a regular light amplifier, the light amplifier can not be used and long-distance optical communication is troubled accordingly. Due to this, in recent years, wavelength division multiplex optical communication is conducted in the wavelength band of 1.55 μm using the installed single-mode transmission optical fibers which have zero dispersion in the wavelength band of 1.3 μm.

However, when optical communication is conducted in the wavelength band of 1.55 μm using a single-mode transmission optical fiber which has zero dispersion at 1.31 μm, since the installed single-mode transmission optical fibers have positive dispersion and a positive dispersion slope in the wavelength band of 1.55 μm, as optical signals propagate through the single-mode transmission optical fiber, the signal at each one of the wavelength division multiplexed wavelengths disperse largely. This makes it difficult to separate the signals at a receiving end, degrades the quality of the optical communication, and impairs the reliability of the optical communication.

To solve such problems, dispersion compensating optical fibers have been developed recently. A dispersion compensating optical fiber has negative dispersion. If a dispersion compensating optical fiber is connected to a receiving end of a single-mode transmission optical fiber, positive dispersion of optical signals which propagate through the single-mode transmission optical fiber is reduced by the negative dispersion of the dispersion compensating optical fiber so that the optical signals are received at the receiving end as they have substantially zero dispersion. As a dispersion compensating optical fiber is connected to a single-mode transmission optical fiber in this manner, it is possible to separate the respective wavelength division multiplexed optical signals at a receiving end, and therefore, a dispersion compensating optical fiber is expected to realize large-capacity high-speed communication of a high quality.

This type of a dispersion compensating optical fiber is formed as a module. It is a common practice to connect a dispersion compensating optical fiber which is formed as short as possible to a receiving end of a single-mode transmission optical fiber for the purpose of compensation of dispersion.

OBJECT AND SUMMARY OF THE INVENTION

However, to form a dispersion compensating optical fiber as a module and compensate dispersion with a short fiber length, it is necessary that the module of the dispersion compensating optical fiber has high negative dispersion and negative dispersion slope.

Despite this, a dispersion compensating optical fiber can not have high negative dispersion and a negative dispersion slope unless very strict conditions regarding various parameters are met which define a distribution of the refractive index of the dispersion compensating optical fiber, which makes it difficult to fabricate the dispersion compensating optical fiber. Further, when a dispersion compensating optical fiber has a refractive index configuration which enables high negative dispersion and a negative dispersion slope, a non-linear phenomena easily occurs, whereby a mode field diameter (MFD) of the optical fiber is reduced. If the non-linearity occurs, the waveforms of signals deform, which is a new problem against an effort to increase the speed and the capacity of wavelength division multiplex light transmission.

If the specific refraction index difference of the center core becomes too large in line with such a structure where the mode field diameter of optical fibers is reduced, a lowering of the transmission quality results from a non-linearity, and a large transmission loss is created when the optical fiber is bent.

Meanwhile, other proposed method is to conduct light transmission using a dispersion shifting optical fiber whose zero dispersion wavelength is shifted to 1.55 μm from 1.31 μm. While signal transmission without dispersion is possible when a dispersion shifting optical fiber which has zero dispersion at the wavelength of 1.55 μm is used for transmission of optical signals without dispersion by means of the wavelength of 1.55 μm, if wavelength division multiplex light transmission is conducted using a signal which is in the wavelength band of 1.55 μm, signals at other wavelengths near 1.55 μm disperse although no dispersion occurs at the wavelength of 1.55 μm. Thus, this light transmission method is not suitable to large-capacity high-speed wavelength division multiplex optical communication. Moreover, this type of a dispersion shifting optical fiber has a further problem that the non-linearity easily occurs.

Conversely, a single-mode optical fiber which has zero dispersion at the wavelength of 1.31 μm is excellent in terms of low non-linearity. Hence, it is ideal to use the installed single-mode transmission optical fibers which have zero dispersion at the wavelength of 1.31 μm as light transmission lines, connect dispersion compensating optical fibers which have low non-linearity and a large mode field diameter to the single-mode transmission optical fibers and conduct wavelength division multiplex light transmission using the wavelengths in the bandwidth of 1.55 μm with substantially zero dispersion.

Noting this, the inventor of the present invention has conceived the present invention from the conventional idea of simply forming a dispersion compensating optical fiber as a module and using the module as an optical fiber which only compensates dispersion. A first object of the present invention is to provide a dispersion compensating optical fiber which is formed in substantially the same length as a single-mode light transmission optical fiber and is connected to the dispersion compensating optical fiber so that the dispersion compensating optical fiber performs a function of transmitting optical signals over a long distance while compensating for dispersion of the optical signals which propagate through the single-mode transmission optical fiber, i.e., so that the dispersion compensating optical fiber has both the function of compensation of dispersion and the function of light transmission. Further, a second object of the present invention is to provide a wavelength division multiplex light transmission line which is realized by connecting a single-mode transmission optical fiber and the dispersion compensating optical fiber described above to each other.

To achieve the objects above, the present invention uses the following means. That is, according to a first aspect of the present invention, in a dispersion compensating optical fiber which is connected to a single-mode transmission optical fiber which has zero dispersion in the wavelength band of 1.31 μm and which transmits optical signals, the means for solving the problems is a structure that a dispersion value σ at the wavelength of 1.55 μm is in the range of −20 ps/nm/km ≦ σ ≦ −10 ps/nm/km and that a ratio of the dispersion value to a dispersion slope in the wavelength band of 1.55 μm is set to be substantially equal in the absolute value but with the opposite sign to a ratio of a dispersion value to a dispersion slope of the single-mode optical fiber in the same wavelength band of 1.55 μm.

Further, according to a second aspect of the present invention, in a dispersion compensating optical fiber which has the structure according to the first aspect, the means for solving the problems is a structure of which a side core which has a low index of refraction is disposed around a center core which has the highest index of refraction, and a clad which has a lower index of refraction than that of the center core but a higher index of refraction than that of the side core is disposed around the side core so that a distribution of the refractive index has a W-type profile.

Further, according to a third aspect of the present invention, in a dispersion compensating optical fiber which has the structure according to the second aspect, the means for solving the problems is a structure of which a specific refractive index difference Δ+ of the center core from the clad is in the range of 1.0% and 1.8%, a ratio R Δ (R Δ=Δ−/Δ+) of a specific refractive index difference Δ− of the side core from the clad to the specific refractive index difference Δ+ of the center core from the clad is equal to or smaller than −0.25, and that a ratio Ra (Ra=a/b) of a diameter a of the center core to a diameter b of the side core is in the range of 0.3 and 0.4.

Further, according to a fourth aspect of the present invention, in a dispersion compensating optical fiber which has the structure according to the first, the second or the third aspect, the means for solving the problems is a structure that a mode field diameter is equal to or larger than 6 μm.

Further, a fifth aspect of the present invention is directed to a wavelength division multiplex light transmission line which is realized by connecting a single-mode transmission optical fiber which has zero dispersion in the wavelength band of 1.31 μm to a dispersion compensating optical fiber which is substantially the same length as the single-mode transmission optical fiber, and the means for solving the problems is a structure that the dispersion compensating optical fiber is formed by the dispersion compensating optical fiber according to either one of the first to the fourth claims.

In the present invention, a wavelength division multiplex light transmission line is realized by connecting a single-mode optical fiber which has zero dispersion in the 1.3 μm-wavelength band (more specifically, at the wavelength of 1.31 μm) to the dispersion compensating optical fiber according to the present invention which is substantially the same length as the single-mode transmission optical fiber. When wavelength division multiplex light transmission is conducted with such a wavelength division multiplex light transmission line using optical signals which are in the wavelength band of 1.55 μm, each wavelength in the wavelength band of 1.55 μm has increasingly larger positive dispersion as the optical signals propagate through the single-mode transmission optical fiber.

The optical signals at the respective wavelength division multiplexed wavelengths are transmitted, propagating from the single-mode optical fiber to the dispersion compensating optical fiber. A dispersion value σ of the dispersion compensating optical fiber is relatively low and negative, in the range of −20 ps/nm/km ≦ σ ≦ −10 ps/nm/km, and a ratio of the dispersion value to a dispersion slope of the dispersion compensating optical fiber in the wavelength band of 1.55 μm is set to be substantially equal in the absolute value but with the opposite sign to a ratio of a dispersion value to a dispersion slope of the single-mode optical fiber at the same wavelength band of 1.55 μm, and therefore, the dispersion which increased during propagation through the single-mode optical fiber is compensated in a direction of gradual decrease during propagation through the dispersion compensating optical fiber, and dispersion at each one of the wavelength division multiplexed wavelengths is compensated to substantially zero when received at a rear end of the dispersion compensating optical fiber.

As described above, the dispersion value σ of the dispersion compensating optical fiber according to the present invention is a negative value which is relatively low and in the range of −20 ps/nm/km ≦ σ ≦ −10 ps/nm/km. As a result, conditions regulating a distribution of refractive index are not as strict as those for a conventional dispersion compensating optical fiber which is formed as a module and has a negative high-dispersion slope. Rather, the conditions are moderate, and therefore, since the value of the specific refraction index difference of the center core will not become excessive, this brings an optical fiber structure of low non-linearity. This makes it possible to suppress creation of a distortion in the waveform of each wavelength for wavelength division multiplex light transmission, and such a structure can be obtained, wherein a mode field diameter to 6 μm or more is obtained. Since it is possible to suppress an increase of the specific refractive index difference of the center core, a lowering of the transmission quality resulting from a non-linearity and an increase in a transmission loss due to bending of the optical fiber can be prevented to enable a large-capacity high-speed wavelength division multiplex light transmission of a high quality with a small transmission loss.

Further, if the distribution of the refractive index of the dispersion compensating optical fiber above has a W-type profile, it is possible to easily fabricate an optical fiber which has a configuration of refractive index which satisfies the conditions above which are set for the dispersion compensating optical fiber above. In addition, as the specific refractive index difference Δ+ of the center core from the clad is in the range of 1.0% and 1.8%, the ratio R Δ (R Δ=Δ−/Δ+) of the specific refractive index difference Δ− of the side core from the clad to the specific refractive index difference Δ+ of the center core from the clad is equal to or smaller than −0.25 and the ratio Ra (Ra=a/b) of the diameter a of the center core to the diameter b of the side core is in the range of 0.3 and 0.4, it is possible to enhance a compensation rate of dispersion which is created during propagation through the single-mode optical fiber ideally to values around 1.0. In the present invention, a dispersion value at the wavelength of 1.55 μm is larger than −20 ps/nm/km but smaller than −10 ps/nm/km, and the ratio of the dispersion value to the dispersion slope in the wavelength band of 1.55 μm is set to be substantially equal in the absolute value but with the opposite sign to the ratio of the dispersion value to the dispersion slope of the single-mode optical fiber in the same wavelength band of 1.55 μm. Hence, by connecting the single-mode optical fiber to the dispersion compensating optical fiber according to the present invention which is substantially the same length as the single-mode transmission optical fiber, it is possible to uniformly compensate and reduce dispersion in the signals at the respective wavelengths in the wavelength band of 1.55 μm in wavelength division multiplex light transmission which is created during propagation through the single-mode optical fiber to zero dispersion at the rear end of the dispersion compensating optical fiber.

Further, since the dispersion compensating optical fiber according to the present invention is not a conventional short optical fiber which is formed as a module, but functions as an optical fiber which not only transmits light but compensates for dispersion which is created in a single-mode optical fiber, the dispersion value of the dispersion compensating optical fiber at the wavelength of 1.55 μm has a relatively small and negative dispersion value which is larger than −20 ps/nm/km but smaller than −10 ps/nm/km. Hence, conditions regulating a distribution of the refractive index are moderate, and therefore, the dispersion compensating optical fiber has low non-linearity. This makes it possible to suppress distortions in the waveforms which are used in wavelength division multiplex light transmission, and such a structure can be obtained, where the mode field diameter is enlarged, and it is possible to prevent the value of the specific refractive index difference of the center core from being increased. Therefore, a lowering of the transmission quality resulting from a non-linearity and an increase in a transmission loss due to bending of the optical fiber can be prevented.

In the configuration with the distribution of the refractive index having a W-type profile, in particular, since the profile has a simple configuration, designing is simple, a transmission loss is small, and the properties easily realize negative dispersion and a negative dispersion slope. Hence, the conditions regulating the distribution of the refractive index are moderate, and therefore, fabrication is easy. Thus, it is possible to provide a dispersion compensating optical fiber and a wavelength division multiplex light transmission line inexpensively using the same which have the excellent properties according to the present invention.

Further, since the profile of the refractive index is W-type and the specific refractive index difference Δ+ of the center core from the clad is 1.8% or smaller, it is possible to set the dispersion value of the dispersion compensating optical fiber at the wavelength of 1.55 μm to be larger than −20 ps/nm/km but smaller than −10 ps/nm/km in an easy manner. In addition, since the specific refractive index difference Δ+ is 1.0% or larger, it is possible to stabilize a layer of fluorine (F) which is doped in the side core. Moreover, if the value Δ+ is suppressed to 1.8% at maximum, it is possible to achieve an enlarging effect of the mode field diameter of the dispersion compensating optical fiber. In the dispersion compensating optical fiber according to the present invention, it is possible to secure a structure where the mode field diameter is enlarged to be 6 μm or more. The value of the mode field diameter is sufficiently larger than the mode field diameter of a conventional dispersion compensating optical fiber which is formed as a module, and therefore, since the specific refractive index difference of the center core can be prevented from being increased by the structure having a large mode field diameter, it is possible to effectively prevent a lowering of the transmission quality resulting from non-linearity and an increase in a transmission loss due to bending of the dispersion compensating optical fiber.

Further, since the ratio R Δ of the specific refractive index difference Δ− of the side core from the clad to the specific refractive index difference Δ+ of the center core from the clad is equal to or smaller than −0.25 and the ratio Ra (Ra=a/b) of the diameter a of the center core to the diameter b of the side core is in the range of 0.3 and 0.4, it is possible to sufficiently enhance a compensation rate for compensating dispersion which is created in the signals at the respective wavelengths for wavelength division multiplex light transmission in the wavelength band of 1.55 μm as the signals propagate through a single-mode optical fiber. Hence, if the wavelength division multiplex light transmission line according to the present invention is used, a transmission loss due to bending is small. Low non-linearity in the wavelength band of 1.55 μm makes it possible to realize large-capacity high-speed wavelength division multiplex optical communication of a high quality without a distortion in signals. Thus, the wavelength division multiplex light transmission line according to the present invention can be used adequately as a wavelength division multiplex light transmission line of the next generation.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which.

DETAILED DESCRIPTION OF THE PREFERRED EMBODIMENT

Figure 1:
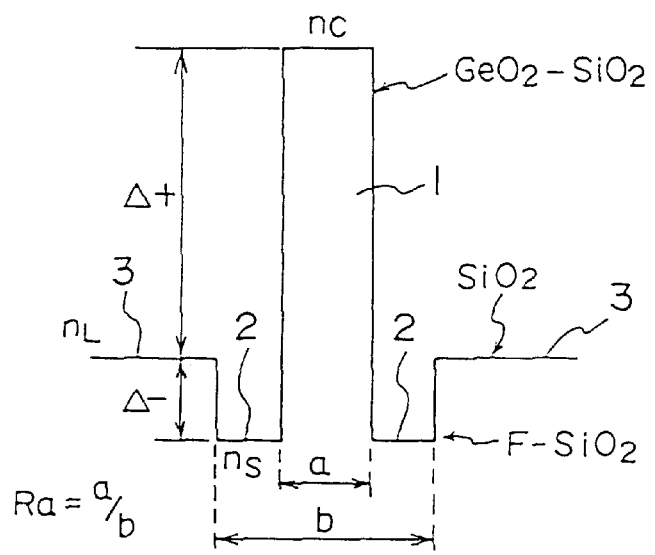
FIG. 1 is a view showing a profile of a distribution of refractive index of a dispersion compensating optical fiber according to a preferred embodiment of the present invention.
Figure 4A:
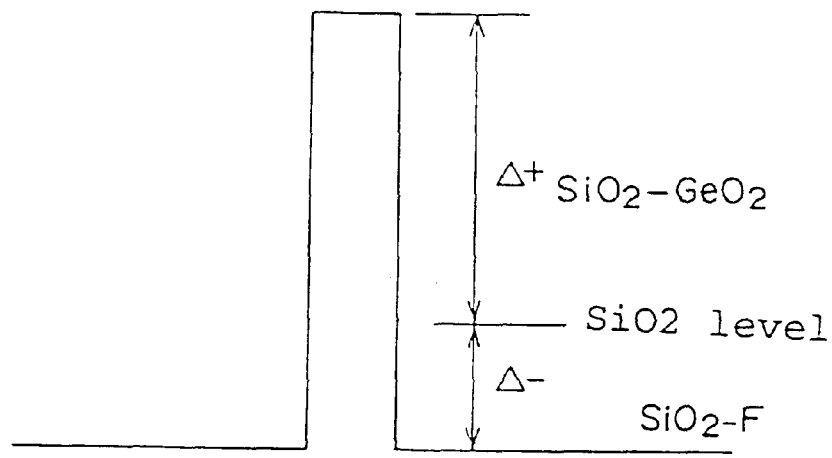
FIGS. 4A, 4B and 4C are explanatory diagrams showing examples of other profile of a distribution of refractive index of the dispersion compensating optical fiber.
Figure 4B:
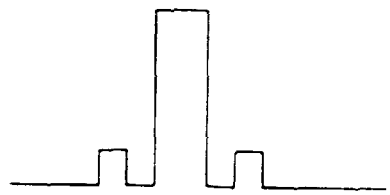
Figure 4C:
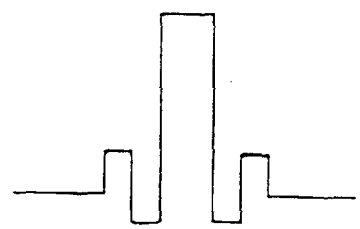

Now, a preferred embodiment of the present invention will be described with reference to the drawings. FIG. 1 shows a profile of a distribution of refractive index of a dispersion compensating optical fiber according to a preferred embodiment of the present invention. While a profile of a distribution of refractive index of a dispersion compensating optical fiber may have various types of configurations such as the matched type as that shown in FIG. 4A, the segment core type as that shown in FIG. 4B, and the double core type as that shown in FIG. 4C, in the preferred embodiment, a distribution of refractive index has a W-type profile as that shown in FIG. 1 which allows a simple configuration, easy designing and controlling of a configuration of the refractive index, a small transmission loss and easy realization of negative dispersion and a negative dispersion slope.

In the W-type profile configuration of the refractive index of the dispersion compensating optical fiber, a side core 2 which has a lower index of refraction than that of a center core 1 is disposed around the center core 1 which has the highest index of refraction, and a clad 3 which has a lower index of refraction than that of the center core 1 but a higher index of refraction than that of the side core 2 is disposed around the side core 2. Thus, a distribution of the refractive index is W-type.

The clad 3 is formed by a layer of pure silica (SiO2). The side core 2 is formed by doping pure silica (SiO2) with fluorine (F) which lowers an index of refraction. The center core 1 is formed by doping pure silica with germanium (Ge) which increases an index of refraction.

In the configuration of the refractive index shown in FIG. 1, a specific refractive index difference Δ+ of the center core 1 from the clad 3 is defined by the following equation (1), where the index of refraction of the center core 1 is nC, the index of refraction of the side core 2 is ns, and the index of refraction of the clad 3 is nL:

$$\Delta+ = \{(nc^2 - nL^2)/2nC^2\} \times 100 \quad (1)$$

Meanwhile, a specific refractive index difference Δ− of the side core 2 from the clad 3 is defined by the following equation (2):

$$\Delta- = \{(ns^2 - nL^2)/2ns^2\} \times 100 \quad (2)$$

The dispersion compensating optical fiber according to the preferred embodiment, converting from the conventional idea of a module of an optical fiber only for compensation of dispersion, has such a structure which realizes a function of compensating dispersion which is created during propagation through a single-mode optical fiber and a function as a transmission line for transmitting an optical signal, and therefore, a value of dispersion of the dispersion compensating optical fiber is set to be larger than −20 ps/nm/km but smaller than −10 ps/nm/km. Thus, since a value of dispersion of the dispersion compensating optical fiber according to the preferred embodiment is a negative dispersion value which is smaller than a dispersion value −55 ps/nm/km of a conventional dispersion compensating optical fiber which is formed as a module (e.g., a dispersion compensating optical fiber module according to Japanese Laid-Open Patent Publication No. Hei-6-11620), conditions which regulate designing of the profile of the W-type distribution of the refractive index are moderate, which allows to form a transmission line having low non-linearity. A single-mode transmission optical fiber which has zero dispersion at the wavelength of 1.31 μm has a dispersion slope of about 17 ps/nm2/km at the wavelength of 1.55 μm but a dispersion slope of about 0.06 ps/nm2/km in the wavelength band of 1.55 μm.

Further, in the preferred embodiment, for reduction and compensation of dispersion which is created in optical signals at the respective wavelengths of wavelength division multiplex light transmission in the wavelength band of 1.55 μm as the optical signals propagate through the single-mode optical fiber uniformly to substantially zero dispersion, a ratio of the dispersion value to the dispersion slope of the dispersion compensating optical fiber in the wavelength band of 1.55 μm is set to be substantially equal in the absolute value but with the opposite sign to a ratio of the dispersion value to the dispersion slope of the single-mode optical fiber in the same wavelength band of 1.55 μm. When the ratio of the dispersion value to the dispersion slope is set as such, if the dispersion compensating optical fiber is connected to the single-mode optical fiber which has zero dispersion at 1.31 μm above in substantially the same length as the single-mode optical fiber, it is possible to abridge and compensate dispersion which is created in the wavelength division multiplexed signals at the respective wavelengths in the wavelength band of 1.55 μm as the optical signals propagate through the single-mode optical fiber uniformly to substantially zero dispersion at the rear end of the dispersion compensating optical fiber.

An important requirement of a dispersion compensating optical fiber is realization of low dispersion in a wide range in the wavelength band of 1.55 μm when the dispersion compensating optical fiber is connected to a single-mode optical fiber. Hence, the inventor studied a possibility of increasing a compensation rate of dispersion, in an effort to optimize the profile of the W-type distribution of the refractive index. The compensation rate of dispersion is defined by the following equation (3):

$$\text{Compensation Rate} = \{S(DCF)S(SMF)\}/\{D(DCF)/D(SMF)\} \quad (3)$$

In the equation (3) above, S(DCF) is an average value of the dispersion slope of the dispersion compensating optical fiber in the wavelength band of 1.55 μm, S(SMF) is an average value of a dispersion slope in the wavelength band of 1.55 μm of a single-mode transmission optical fiber which has zero dispersion at the wavelength of 1.31 μm, D(DCF) is a dispersion value of the dispersion compensating optical fiber at the wavelength of 1.55 μm, and D(SMF) is a dispersion value at the wavelength of 1.55 μm of the single-mode transmission optical fiber which has zero dispersion at the wavelength of 1.31 μm.

It is verified that in the dispersion compensating optical fiber which has the W-type profile of the refractive index, a dispersion slope which compensates low dispersion in the wavelength band of 1.55 μm is obtained if the ratio R Δ (R Δ=Δ−/Δ+) of the specific refractive index difference Δ− of the side core 2 from the clad 3 to the specific refractive index difference Δ+ of the center core 1 from the clad 3 is equal to or smaller than −0.25. Noting this, the value R Δ of the dispersion compensating optical fiber according to the preferred embodiment is set to −0.25 or smaller.

Table 1 compares a compensation rate when the value R Δ is −0.285 with compensation rates with changed parameters for the W-type profile.

TABLE 1

| Δ+ (%) | Δ− (%) | Core diameter (μm) | Dispersion (ps/nm/km) | Dispersion Slope (ps/nm²/km) | Compensation Rate (%) |
|---|---|---|---|---|---|
| 2.8 | −0.798 | 2.23 | −219 | −0.78 | 94 |
| 2.4 | −0.684 | 2.44 | −178 | −0.73 | 108 |
| 2.0 | −0.570 | 2.86 | −99 | −0.37 | 99 |
| 1.6 | −0.456 | 3.19 | −72 | −0.29 | 106 |
| 1.2 | −0.342 | 3.69 | −46 | −0.16 | 92 |
| 0.8 | −0.228 | 4.02 | −18 | −0.07 | 105 |

The dispersion in Table 1 is actual measurements at the wavelength of 1.55 μm, and the dispersion slopes are average values among the wavelengths from 1.53 μm to 1.57 μm. The data shown in Table 1 are data which are obtained when a value of the ratio Ra (Ra=a/b) of the diameter a of the center core 1 to the diameter b of the side core 2 is fixed to 0.4.

As understood from Table 1, as the value R Δ is −0.285, high compensation rates of dispersion from 92% to 108% are obtained.

Figure 2:
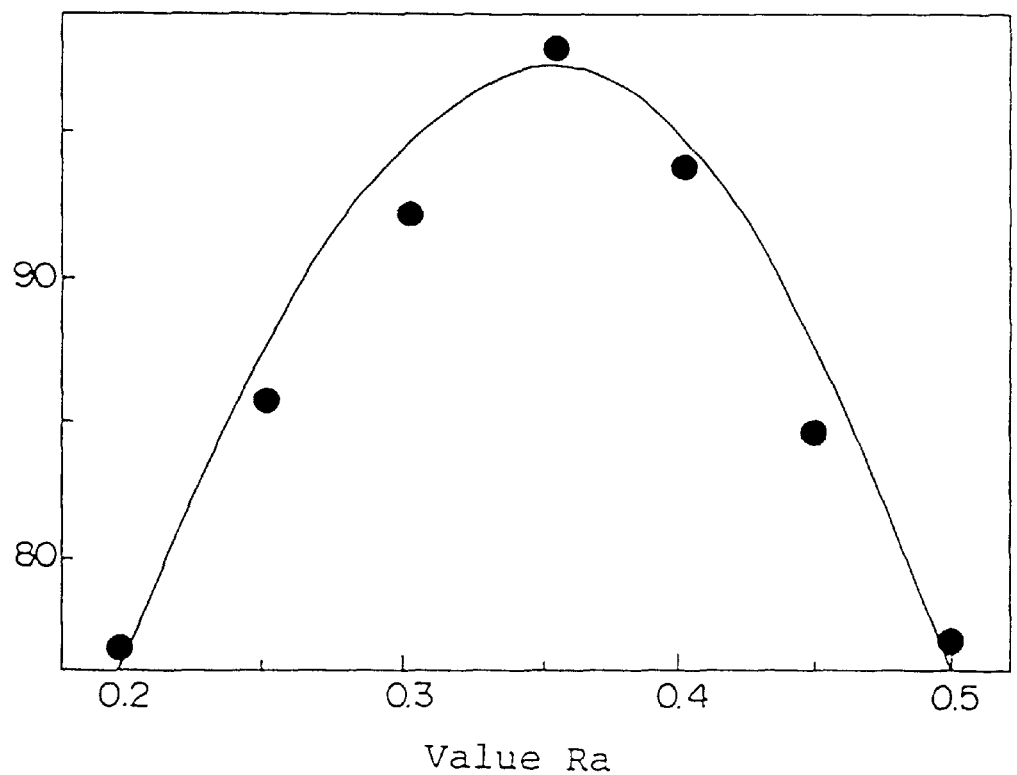
FIG. 2 is a view showing simulation of a relationship between a value Ra and a compensation rate of the dispersion compensating optical fiber according to the present invention.

Next, the inventor identified an optimum range of the value Ra which can sufficiently satisfy a compensation ratio of dispersion, by simulation under the condition the value R Δ was −0.25 or smaller. FIG. 2 shows the results of the simulation. The solid line in FIG. 2 is a theoretical curve, while the plot points represent the data which were obtained by the simulation.

It is verified from the simulation results shown in FIG. 2 that sufficiently satisfactory high compensation rates are obtained if the value Ra is in the range from 0.3 to 0.4. Based on the simulation results, the value Ra of the dispersion compensating optical fiber according to the preferred embodiment is set to a value in the range from 0.3 to 0.4.

Further, the simulation results have also identified that when the value Ra is set to be within the range from 0.3 to 0.4 and the value R Δ is set to be −0.25 or smaller, a value of the specific refractive index difference Δ+ of the center core 1 from the clad 3 must be 1.8% at maximum or smaller than the same to allow the dispersion value to be larger than −20 ps/nm/km but smaller than −10 ps/nm/km. When the value Δ+ is 1.8% or smaller, it is possible to enlarge the mode field diameter (MFD) of the dispersion compensating optical fiber. In the preferred embodiment, the mode field diameter is enlarged to 6 μm or larger. Comparing to the value 4.4 μm of the mode field diameter of the dispersion compensating optical fiber module according to Japanese Laid-Open Patent Publication No. Hei-6-11620, it is clear that the value of the mode field diameter which is 6 μm or larger is sufficiently large. If the value Δ+ is too small, during fabrication of the dispersion compensating optical fiber, the layer of fluorine (F) which is doped in the side core 2 becomes unstable and the clear W-type profile configuration shown in FIG. 1 can not be achieved. To prevent this, it is necessary that the value Δ+ is 1.0% or larger. In the preferred embodiment, the value Δ+ is set to be 1.0% or larger but 1.8% or smaller.

That is, the dispersion compensating optical fiber module according to the present invention has the W-type profile of the distribution of the refractive index, and the specific refractive index difference Δ+ of the center core 1 from the clad 3 is set to be from 1.0% to 1.8%, the value R Δ (R Δ=Δ−/Δ+) is set to −0.25 or smaller, and the value Ra is set to be from 0.3 to 0.4, so that the mode field diameter is 6 μm or larger, and a value of dispersion in the wavelength band of 1.55 μm is from −20 ps/nm/km to −10 ps/nm/km.

In the conventional dispersion compensating optical fiber which is formed as a module, since a negative high-dispersion value and a high-dispersion slope are pursued for compensation, in a short fiber length, of dispersion which propagates through a single-mode optical fiber, the specific refractive index difference Δ+ of the center core of the dispersion compensating optical fiber which has the W-type profile is as large as and close to 2%. Thus, a non-linearity occurs as the specific refractive index difference Δ+ of the center core becomes a large value, and the transmission quality may be lowered by a waveform distortion resulting from the non-linearity, and the transmission loos due to bending may be increased. In addition, despite circumstances which require to decrease the core diameter, since the mode field diameter of the conventional dispersion compensating optical fiber module is at most about 5 μm even when enlarged, and such a structure is obtained, where the mode field diameter is small. Since the specific refractive index difference of the center core is too large, the transmission quality is lowered due to non-linearity, and a transmission loss due to bending is large. In contrast, the dispersion compensating optical fiber according to the embodiment has a low negative dispersion value and a low dispersion slope, and therefore, conditions which regulate designing of parameters which define the W-type profile are moderate. This allows to obtain a low non-linearity, and such a structure can be obtained where the mode field diameter is large. Thereby, it is possible to decrease the specific refractive index difference Δ+ of the center core to 1.8% or less, and it is possible to suppress a lowering of the transmission quality, which results from the non-linearity of a dispersion compensating optical fiber, and possible to suppress an increase of the transmission loss due to bending of the dispersion compensating optical fiber.

An experiment which was conducted by the inventor has verified that it is possible to sufficiently achieve the condition that the mode field diameter is 6 μm or larger at the wavelength of 1.55 μm while keeping a transmission loss due to bending to 5dB/m or smaller where the diameter is 20mm. This value sufficiently satisfies the conditions for an optimum transmission optical fiber which has low non-linearity, sufficiently deals with bending as a light transmission line, and is most appropriate to wavelength division multiplex light transmission.

Figure 5:
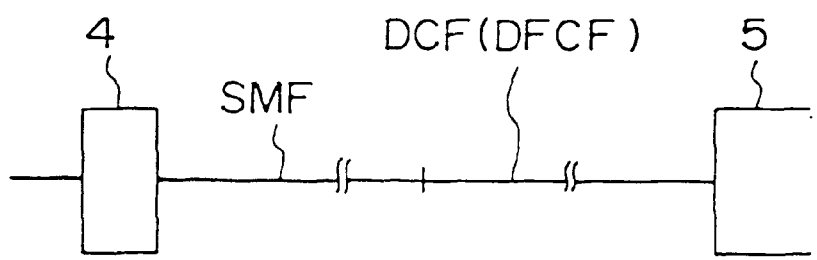
FIG. 5 is an explanatory diagram of a wavelength division multiplex light transmission line according to the preferred embodiment of the present invention.

FIG. 5 shows a wavelength division multiplex light transmission line according to the preferred embodiment. The light transmission line is obtained by connecting the dispersion compensating optical fiber DCF according to the preferred embodiment to a single-mode transmission optical fiber SMF which has zero dispersion at the wavelength of 1.31 μm, where the dispersion compensating optical fiber DCF has substantially the same length as the single-mode transmission optical fiber SMF. In FIG. 5, denoted at 4 is a light amplifier whose gain bandwidth is in the wavelength band of 1.55 μm, while denoted at 5 is a receiving station.

Table 2 shows the results whether the wavelength division multiplex light transmission line is suitable as various types of transmission lines.

TABLE 2

| Fiber | SMF | DSF | SMF + WDFCF | SMF + WDFCF | DFF | SMF + DFCF For Transmission Line |
|---|---|---|---|---|---|---|
| WDM transportation | X | Δ | Δ | ○ | ⊙ | ⊙⊙⊙ |

In Table 2, the symbol × indicates that the line is not appropriate as a wavelength division multiplex light transmission line, the symbol Δ indicates the line is not preferable very much although the line has practicability, the symbol ○ indicates the line is a line which is somewhat better, and the symbol ⊚ indicates the line is a line which is suitable as a wavelength division multiplex light transmission line. The transmission line according to the preferred embodiment with three ⊚ is an optimum line for wavelength division multiplex light transmission.

The optical fiber SMF shown in Table 2 is the installed single-mode optical fibers which have zero dispersion at the wavelength of 1.31 µm. The optical fiber DSF is a dispersion shifting optical fiber which has zero dispersion at the wavelength of 1.55 µm. The optical fiber SMF+MDCF is a line which is obtained by connecting a dispersion compensating optical fiber module whose distribution of refractive index is of the matched type to a single-mode transmission optical fiber which has zero dispersion at the wavelength of 1.31 µm. The optical fiber SMF+WDFCF is an optical line which is obtained by connecting a single-mode transmission optical fiber to a dispersion compensating optical fiber module whose distribution of refractive index has a W-type profile. The optical fiber DFF is a dispersion flat fiber which has zero dispersion at the wavelength of 1.55 µm and whose dispersion slope in that waveband is zero. The optical fiber SMF+DFCF For Transmission Line is the light transmission line according to the preferred embodiment, which is a line which is obtained by connecting the dispersion compensating optical fiber according to the preferred embodiment to a single-mode transmission optical fiber which has zero dispersion at the wavelength of 1.31 µm in such a manner that the dispersion compensating optical fiber has substantially the same length as the single-mode transmission optical fiber.

While the results shown in Table 2 indicate that the dispersion flat fiber DFF as well is a light transmission line which is suitable for wavelength division multiplex light transmission, this type of dispersion flat fiber accompanies strict conditions regarding a distribution of refractive index. Since characteristics such as dispersion and a dispersion slope are changed even with the slightest deviation from the conditions, it is difficult to fabricate this type of dispersion flat fiber. Thus, this type of dispersion flat fiber is not necessarily desirable as a stable general-purpose wavelength division multiplex light transmission line. It is verified that the light transmission line according to the preferred embodiment is an optimum general-purpose optical line. The light transmission line according to the preferred embodiment is expected as the most suitable wavelength division multiplex light transmission line of the next generation.

Figure 3:
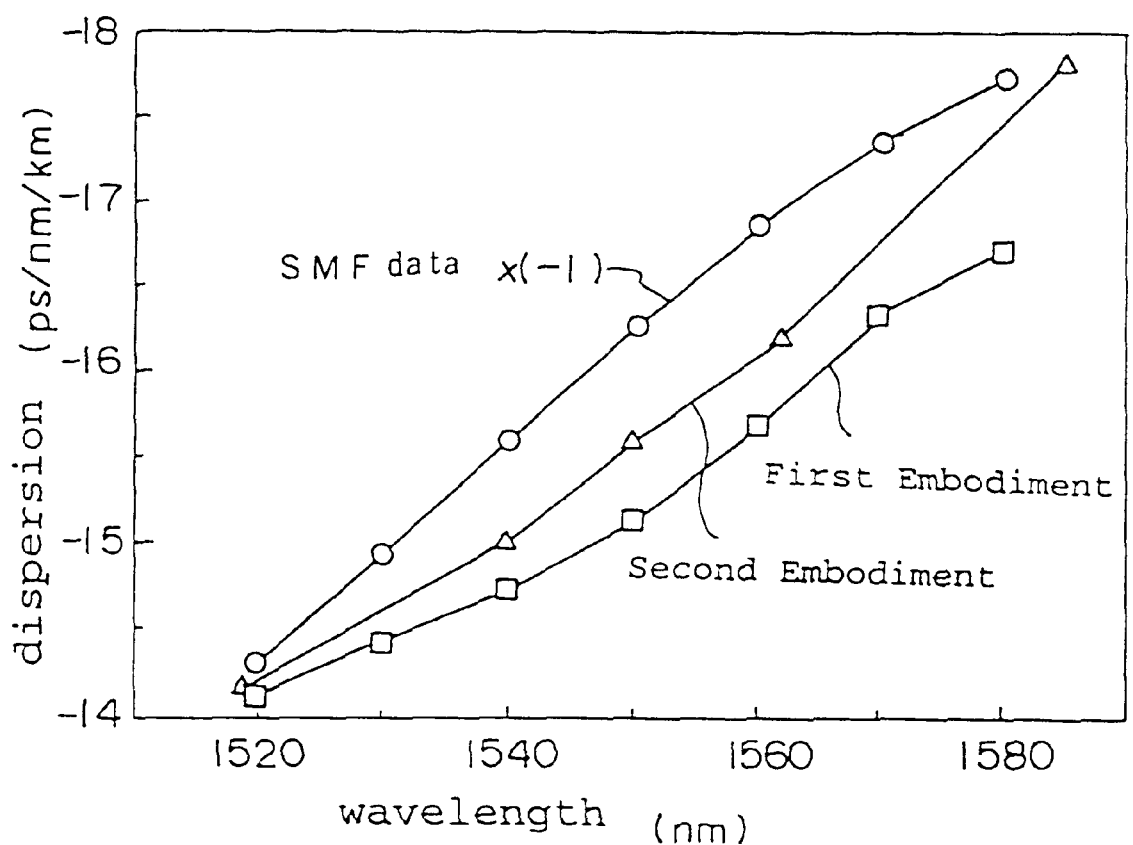
FIG. 3 is a graph comparing wavelength dispersion characteristics according to an example 1 and an example 2 of the present invention with data which are obtained by multiplying wavelength dispersion characteristics of a single-mode optical fiber by −1.

Next, specific examples of the present invention will be described. First, as an example 1, a dispersion compensating optical fiber was formed as a W-type which had a distribution of refractive index as that shown in FIG. 1, Δ+ of 1.44%, R Δ of −0.285 and Ra of 0.37. FIG. 3 shows results on wavelength dispersion characteristics of the dispersion compensating optical fiber of the example 1.

In a similar manner, a dispersion compensating optical fiber was formed as an example 2 which had a W-type distribution of refractive index, Δ+ of 1.11%, R Δ of −0.375 and Ra of 0.33. FIG. 3 also shows results on wavelength dispersion characteristics of the dispersion compensating optical fiber of the example 2. FIG. 3 further shows, as a comparison example, data which are obtained by multiplying wavelength dispersion characteristics of a single-mode optical fiber which has zero dispersion at the wavelength of 1.31 µm (i.e., SMF data) by −1.

As clear from the wavelength dispersion characteristics shown in FIG. 3, the data for the example 1 and the data for the example 2 are both close to the data which are obtained by multiplying the wavelength dispersion characteristics of the single-mode optical fiber by −1. This indicates that if the compensating optical fibers of the examples 1 and 2 are connected to the single-mode optical fiber in such a manner that the dispersion compensating optical fibers have substantially the same length as the single-mode transmission optical fiber, it is possible to abridge and compensate dispersion which is created the respective wavelengths in the wavelength band of 1.55 µm during propagation through the single-mode transmission optical fiber effectively to substantially zero dispersion at the rear end of the dispersion compensating optical fiber.

Next, Table 3 compares the results on characteristics of a dispersion compensating optical fiber according to other example of the present invention with characteristics of conventional dispersion compensating optical fiber modules. In Table 3, the letter W indicates that a distribution of refractive index has a W-type profile, while the letter M indicates that a distribution of refractive index is of the matched type. Further, the dispersion values in Table 3 are values at the wavelength of 1.55 µm, bending losses indicate transmission losses due to bending with a diameter of 20 mm, and the symbol MFD indicates mode field diameters.

TABLE 3

|  | Type | Dispersion (ps/nm/km) | Dispersion Slope (ps/nm²/km) | Bending Loss With φ = 20 (dB/m) | MFD (µm) |
|---|---|---|---|---|---|
| Example | W | −15,55 | −0.0561 | 3.136 | 7.83 |
| Module | W | −106.78 | −0.3643 | 8,183 | 5.06 |
| Module | M | −80.51 | 0.0213 | 5.269 | 4.09 |

With respect to the dispersion compensating optical fiber according to the example shown in Table 3, dispersion indicates a negative value which is as low as −15.55 ps/nm/km, and the dispersion slope has a negative value which is as small as −0.0561 ps/nm2/km. Thus, compared with the conventional dispersion compensating optical fiber modules, the dispersion compensating optical fiber has sufficiently small negative dispersion and a sufficiently small negative dispersion slope. In addition, such a fiber structure can be obtained, where the bending loss is small since the mode field diameter is 7.83 µm which is magnificently larger than that of the conventional dispersion compensating optical fiber modules, and an increase of the specific refractive index difference of the center core can be suppressed. Hence, the bending loss becomes a small value and a lowering of the transmission quality resulting from non-linearity can be suppressed. Therefore, it has been verified that this optical transmission line is most suitable for a high-speed large capacity wavelength multiplex transmission.

What we claim is:

1. A dispersion compensating optical fiber which is connected to a single-mode optical fiber which has zero dispersion in the wavelength band of 1.31 µm so as to transmit an optical signal, characterized in that a dispersion value σ at the wavelength of 1.55 µm is in a range of −20 ps/nm/km ≦σ≦ −10 ps/nm/km, and a ratio of the dispersion value to a dispersion slope of said dispersion compensating optical fiber in the wavelength band of 1.55 µm is set to be substantially equal in the absolute value but with the opposite sign to a ratio of a dispersion value to a dispersion slope of said single-mode optical fiber in the same wavelength band of 1.55 µm.

2. The dispersion compensating optical fiber of claim 1, wherein a side core which has a low index of refraction is disposed around a center core which has the highest index of refraction, and a clad which has a lower index of refraction than that of said center core but a higher index of refraction than that of the side core is disposed around the side core so that a distribution of the refractive index has a W-type profile.

3. The dispersion compensating optical fiber of claim 2, wherein a specific refractive index difference Δ+ of the center core from the clad is in the range of 1.0% and 1.8%, a ratio R Δ (R Δ=Δ−/Δ+) of a specific refractive index difference Δ− of the side core from the clad to the specific refractive index difference Δ+ of the center core from the clad is equal to or smaller than −0.25, and a ratio Ra (Ra=a/b) of a diameter a of the center core to a diameter b of the side core is in the range of 0.3 and 0.4.

4. The dispersion compensating optical fiber of claim 1, wherein a mode field diameter is equal to or larger than 6 μm.

5. The dispersion compensating optical fiber of claim 2, wherein a mode field diameter is equal to or larger than 6 μm.

6. The dispersion compensating optical fiber of claim 3, wherein a mode field diameter is equal to or larger than 6 μm.

7. A wavelength division multiplex light transmission line which is realized by connecting a single-mode transmission optical fiber which has zero dispersion in the wavelength band of 1.31 μm to a dispersion compensating optical fiber which is substantially the same length as the single-mode transmission optical fiber, characterized in that said dispersion compensating optical fiber is formed by the dispersion compensating optical fiber according to claim 1.

8. A wavelength division multiplex light transmission line which is realized by connecting a single-mode transmission optical fiber which has zero dispersion in the wavelength band of 1.31 m to a dispersion compensating optical fiber which is substantially the same length as the single-mode transmission optical fiber, characterized in that said dispersion compensating optical fiber is formed by the dispersion compensating optical fiber according to claim 2.

9. A wavelength division multiplex light transmission line which is realized by connecting a single-mode transmission optical fiber which has zero dispersion in the wavelength band of 1.31 μm to a dispersion compensating optical fiber which is substantially the same length as the single-mode transmission optical fiber, characterized in that said dispersion compensating optical fiber is formed by the dispersion compensating optical fiber according to claim 3.

10. A wavelength division multiplex light transmission line which is realized by connecting a single-mode transmission optical fiber which has zero dispersion in the wavelength band of 1.31 μm to a dispersion compensating optical fiber which is substantially the same length as the single-mode transmission optical fiber, characterized in that said dispersion compensating optical fiber is formed by the dispersion compensating optical fiber according to claim 4.

11. A wavelength division multiplex light transmission line which is realized by connecting a single-mode transmission optical fiber which has zero dispersion in the wavelength band of 1.31 μm to a dispersion compensating optical fiber which is substantially the same length as the single-mode transmission optical fiber, characterized in that said dispersion compensating optical fiber is formed by the dispersion compensating optical fiber according to claim 5.

12. A wavelength division multiplex light transmission line which is realized by connecting a single-mode transmission optical fiber which has zero dispersion in the wavelength band of 1.31 μm to a dispersion compensating optical fiber which is substantially the same length as the single-mode transmission optical fiber, characterized in that said dispersion compensating optical fiber is formed by the dispersion compensating optical fiber according to claim 6.

* * * * *

UNITED STATES PATENT AND TRADEMARK OFFICE
CERTIFICATE OF CORRECTION

PATENT NO. : 6,178,279 B1
DATED : January 23, 2001
INVENTOR(S) : Mukasa et al.

It is certified that error appears in the above-identified patent and that said Letters Patent is hereby corrected as shown below:

Abstract,
Line 8, "-20 ms/nm/km" should read -- -20 ps/nm/km --.

Claims,
Claim 8, column 13,
Line 36, "1.31 m" should read -- 1.31 μm.

Signed and Sealed this

Twenty-third Day of October, 2001

Attest:

NICHOLAS P. GODICI
Attesting Officer
Acting Director of the United States Patent and Trademark Office